United States Patent [19]
Eberly et al.

[11] 3,880,073
[45] Apr. 29, 1975

[54] FEEDING MECHANISMS OF A HAY BALER

[75] Inventors: Harry C. Eberly, Narvon; Thomas B. Moody; George Yatcilla, both of New Holland, all of Pa.

[73] Assignee: Sperry Rand Corporation, New Holland, Pa.

[22] Filed: June 27, 1973

[21] Appl. No.: 374,200

Related U.S. Application Data

[63] Continuation of Ser. No. 154,929, June 21, 1971, abandoned.

[52] U.S. Cl. .............. 100/142; 100/189; 56/341; 198/223
[51] Int. Cl. ............................................ B30b 15/30
[58] Field of Search ...... 100/188, 189, 142; 56/341, 56/343, 364; 198/223; 172/696, 763

[56] References Cited
UNITED STATES PATENTS
2,765,902  10/1956  Myers ............................ 198/223
2,950,670  8/1960  Nolt et al. ....................... 100/142
3,367,094  2/1968  Harwig ........................... 100/189 X FOREIGN PATENTS OR APPLICATIONS
227,115  10/1910  Germany ........................ 100/189
769,438  10/1967  Canada .......................... 100/189

*Primary Examiner*—Peter Feldman
*Attorney, Agent, or Firm*—John R. Flanagan; Frank A. Seemar; Joseph A. Brown

[57] ABSTRACT

A feed mechanism of a hay baler has a feed finger support bar pivotally connected at the bale case end to an elliptical chain and sprocket drive and guided at the other end in a curved cam track. The support bar has an adjustable bracket at the bale case end holding a pair of downwardly extending feed fingers sloped and curved forwardly in the direction of feed.

4 Claims, 6 Drawing Figures

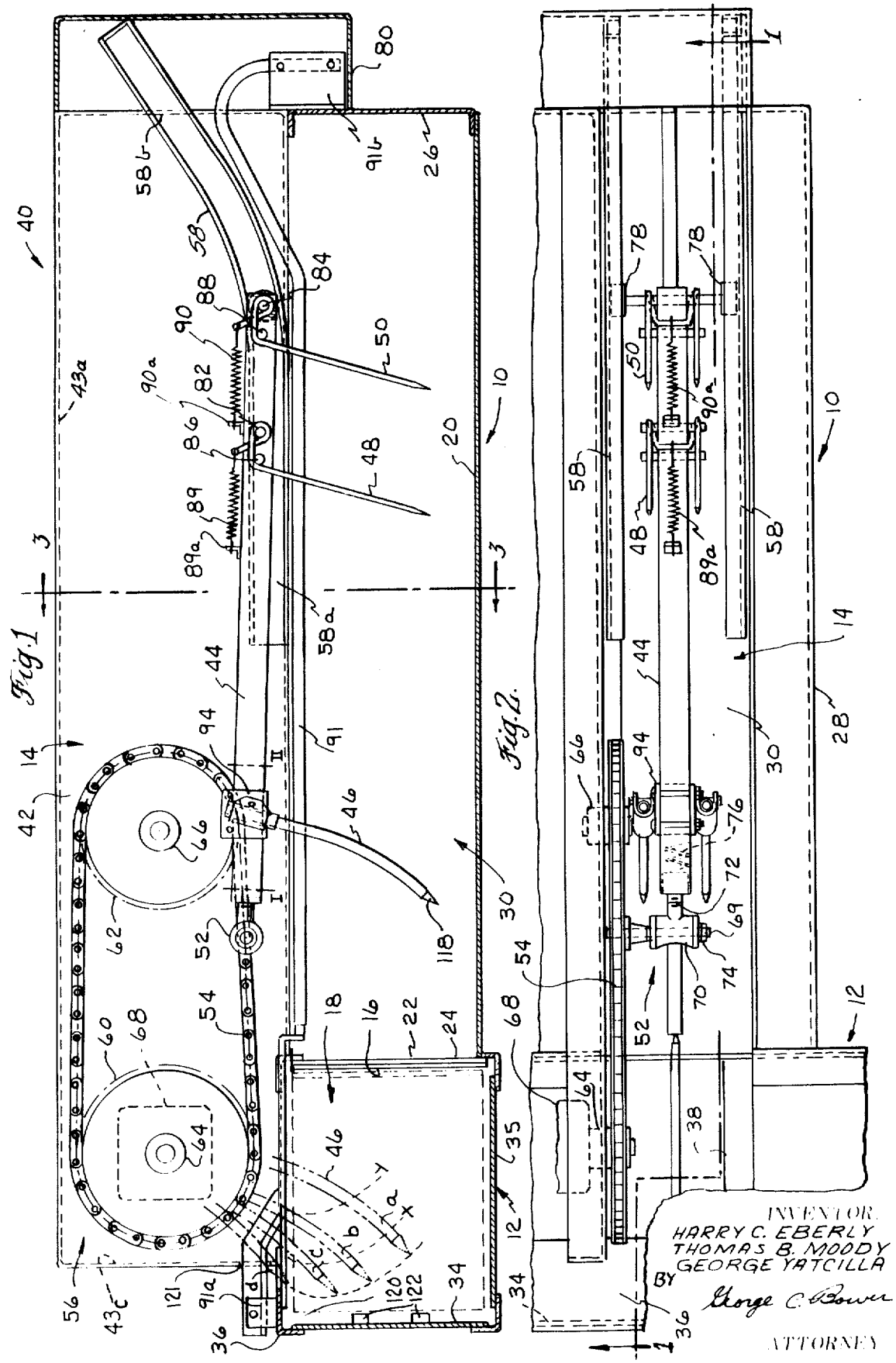

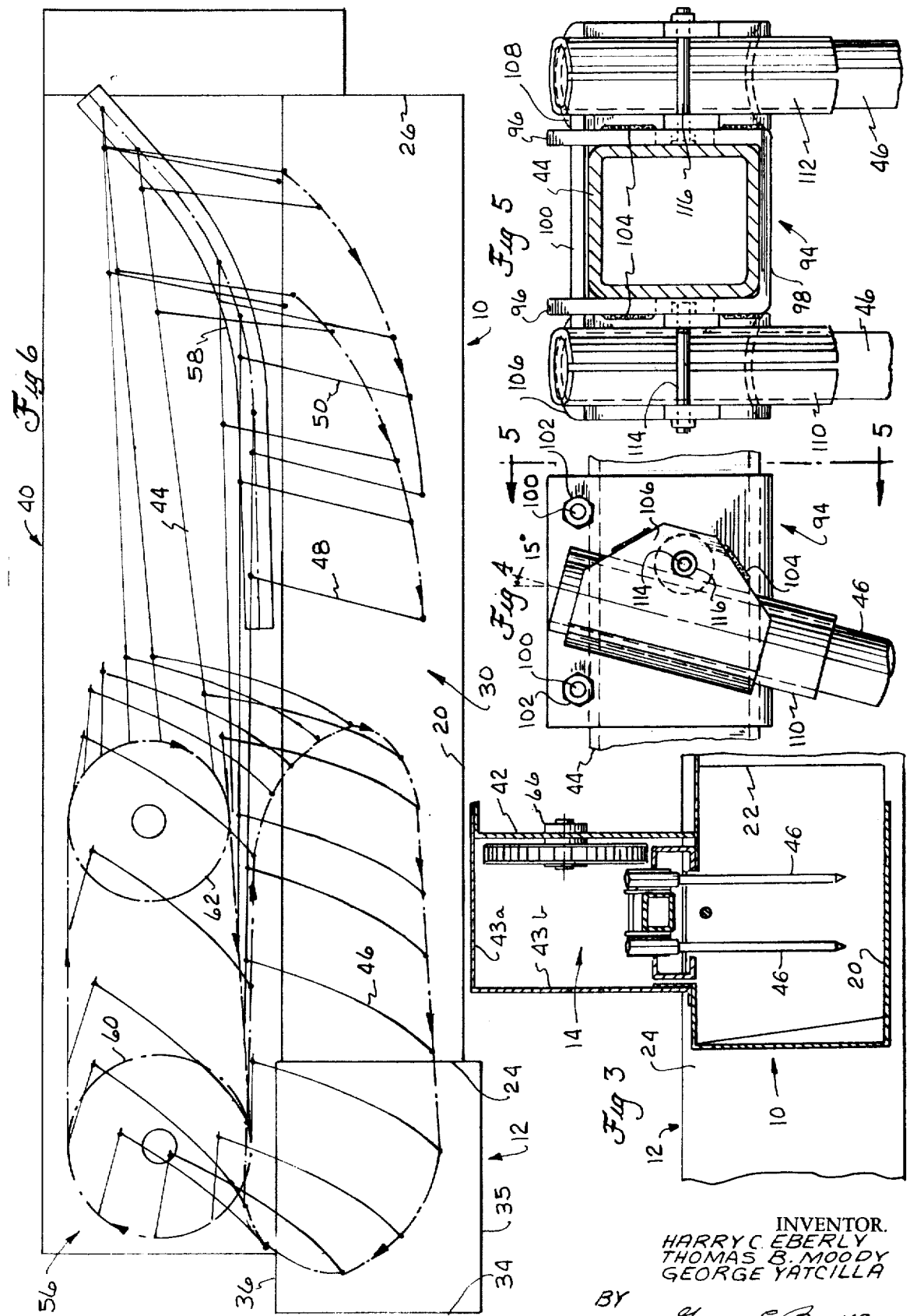

3,880,073

FEEDING MECHANISMS OF A HAY BALER

CROSS REFERENCE TO RELATED APPLICATION

This application is a continuation of application Ser. No. 154,929, filed June 21, 1971, now abandoned.

BACKGROUND OF THE INVENTION

This invention relates to hay balers and is directed particularly to feed mechanisms for sweeping hay into bale cases.

In the U.S. Pat. No. 2,950,670, the feed mechanism is mounted above the bale case and feed chamber and comprises a feed finger support bar pivotally connected at the bale case end to an elliptical chain and sprocket drive and at the other end rolls in a cam track curved downwardly and parallel to the feed chamber. Spring loaded feed fingers are pivotally mounted on the support bar at the cam track end to normally extend downwardly into the feed chamber on a feed stroke and swing up to a generally horizontal position on the return stroke. At the bale case end, a pair of straight feed fingers are mounted on the support bar for carrying the hay into the bale case. The feeding mechanism evenly distributes the hay in the bale case and properly fills the upper, outer corner of the bale case remote from the feed chamber. The baler operates very satisfactorily and forms square shaped bales. As stated in that patent this baler bales hay under all conditions normally encountered. Occasionally a very unusual crop or crop condition may occur when satisfactory bales are difficult to form.

OBJECTS AND SUMMARY OF THE INVENTION

An object of this invention is to improve the versatility of the aforementioned hay baler.

Another object of this invention is to improve the adaptability of the feed mechanism of the aforementioned hay baler in feeding crop material to make square shaped bales of very unusual crops and crop conditions.

In summary, this invention comprises a hay baler having a feed mechanism with a feed finger support bar in which the lead feed fingers are adjustably positioned along the support bar and slope and curve forwardly in the direction of the feed to lift the hay along the outer wall of the bale case and to carry hay up into the upper, outer corner of the bale case.

Other and further objects and advantages of this invention will be apparent from the following specification and dependent claims taken in connection with the drawings which illustrates a preferred embodiment of the invention.

BRIEF DESCRIPTION OF THE DRAWINGS

FIG. 1 is a transverse sectional view of the baler taken along the line 1—1 of FIG. 2 and illustrates a preferred embodiment of the feed mechanism and schematically illustrates paths of the lead feed fingers when mounted in various positions on the support bar.

FIG. 2 is a fragmentary top plan view of the baler showing the feed mechanism FIG. 1.

FIG. 3 is a sectional view of the feed mechanism taken along line 3—3 of FIG. 1.

FIG. 4 is an enlarged detailed side view of the finger support bracket mounted on the support member.

FIG. 5 is a rear view of the bracket taken from the section line 5—5 of FIG. 4.

FIG. 6 is a diagrammatical view schematically illustrating the positions of the lead feed finger in the foremost position on the support bar.

DETAILED DESCRIPTION OF THE PREFERRED EMBODIMENT

Introduction

In the drawings, the feed casing 10, bale case 12 and feed mechanism 14 of a pull type hay baler are shown in FIG. 1. As the baler moves along a windrow in a field, the hay is picked up by a pickup unit, not shown, and delivered to the feed casing 10 for delivery to the bale case 12 by the feed mechanism 14. A plunger 16 in the bale chamber 18 of the bale case compresses the hay into a bale.

The feed casing has a horizontal platform 20 extending perpendicular to the bale case and from the lower edge of the feed opening 22 in the inner wall 24 (FIG. 2) of the bale case. The right end of the feed casing has an end wall 26 and the back of the casing is enclosed by a rear wall 28, FIG. 2, to form a feed chamber 30 above the platform 20. The bale case is rectangular in cross section and has an outer wall 34, inner wall 24 with the opening 22, a bottom wall 35 and a top wall 36 with a transverse slot 38 joining the opening 22.

The feed mechanism 14 is enclosed within a drive housing 40 comprising a vertical front support wall 42 positioned over the bale case and feeder casing and top and rear walls 43a, b and left end wall 43c. The feed mechanism comprises a feed finger support bar 44 carrying a pair of lead or inner feed fingers 46 and pivotally mounted pairs of rear or outer feed fingers 48 and 50. At the bale case end, the support bar has a pivotal connection 52 to the chain 54 of the chain and sprocket drive 56. At the right end the support bar rolls in cam tracks 58 which lift the rear feed fingers 48 and 50 clear of the feed chamber for downward penetration of the hay (FIG. 6).

Feed Mechanism

The chain and sprocket drive 56 comprises two spaced sprockets 60 and 62 drivingly connected by the chain 54. The sprockets are rotatably mounted in bearings 64 and 66 on the vertical front support wall 42. The sprocket 60 is driven by the gearbox 68 which is, in turn, driven by a chain and sprocket drive, not shown, connected to the plunger drive, not shown, to drive the feed mechanism in timed relation with the plunger.

The pivotal connection 52 comprises a pin 69 (FIG. 2) a sleeve 70 and a rod 72. The pin 69 is fastened to the chain 54 and extends prependicularly from the side thereof to rotatably fit in the sleeve 70 and be secured therein by fastening means 74. The feed finger support bar 44 is tubular and square in cross section. The rod is connected to the support bar through a metering means or spring pressure relief means 76, more fully described in the aforementioned U.S. Pat. No. 2,950,670. This pressure release spring means permits the pivotal connection to continue with the chain when the lead feed fingers 46 become overloaded. The support bar is mounted in the cam tracks 58 by rollers 78 mounted on the right end of the support bar. The cam tracks are channel shaped having straight portions 58a parallel to the feed platform and a rear, upwardly curved portion 58b for lifting the feed fingers 48 and 50 clear of the feed chamber. The right end of the curved portions extends beyond the drive housing so that the point of the rear feed fingers 50 will be adjacent the end wall 26 to clear the right end of the feed chamber of incoming hay. Casing 80 houses the ends of the cam tracks.

The rear feed fingers 48,50 are pivotally mounted on pins 82 and 84, respectively, for rotation of the feed fingers to a generally horizontal position on a return stroke. Stops 86 and 88 in conjunction with the springs 89 and 90 to return the feed fingers to the generally vertical position for the feed stroke. The springs are anchored by angles 89a,90a secured to the bar 44. The feed fingers are sloped forward in the direction of feed. The lead feed fingers 46 are removably mounted in the bracket 94 and the bracket is adjustably mounted for movement on the pivotal connection end of the support bar. The crop guard rod 91 extends the length of the feed chamber and across the bale case for attachment to the wall 36 by bracket 91a. At the other end the rod is attached to the outer side of the end wall by bracket 91b. The feed fingers straddle the crop guard so that the hay is held in the feed chamber and bale case as the feed fingers are withdrawn.

Lead Feed Fingers and Support Bracket

Referring more particularly to FIGS. 3-5, the support bracket 94 has a U-shape with spaced upwardly extending side legs 96 and a connecting base 98. The legs of the bracket fit snugly against the sides of the tubular member and the base engages the bottom of the square shape tubular support bar. The legs extend upwardly on the sides and are fastened by the bolts 100 which extend through the legs and secured by the nuts 102 threaded on the bolts. On each side of the bracket and secured to the legs by welds 104 are U-shaped clamps 106 and 108. The clamps have cylindrical split sleeves 110 and 112 fastened respectively thereto. The feed fingers 46 fit in the sleeves 110 and 112 and are held in place by the clamping action of the bolts and nut assembly 114,116, repectively. The clamps and sleeves are tilted at a 15° angle, FIG. 4, to the vertical to project the feed fingers 46 forwardly towards the bale case.

The feed fingers are also curved forwardly as best illustrated in FIG. 1. The preferred form of the lead feed fingers is cylindrical with a conical tip 118. The fingers have an upper straight mounting portion and a lower curved portion.

The bracket 94 may be set over a range of positions I to II (FIG. 1) depending upon the desired path of delivery of the hay into the bale chamber. In FIG. 1, various positions of the feed fingers 46, while in the bale case are illustrated in dashed lines corresponding to the various positions the support bracket 94 can be mounted on the support bar 44.

Operation

The operation of the feed mechanism set forth herein is similar to the feed mechanism of the aforementioned patent except as modified by this invention. The movement of the support bar is about the same as the movement of the support bar of the feed mechanism of the aforementioned patent. The positions of the support bar 44 are diagrammatically shown in FIG. 6. As the pivotal connection 52 moves down the sprocket 62 the lead feed fingers 46 commence to enter the feed chamber 30. In this downward movement, and particularly when the feed fingers enter the feed chamber, the support bar is inclined slightly downwardly toward the feed platform 20. The cam track end of the support bar is in the upper portion of the cam track 58 and the pivotal connected end is moving downwardly around the sprocket 62. The angle of inclination increases as the feed fingers move down through the upper portion of the feed chamber. The feed fingers are also starting to enter the hay. As the forward movement of the feed fingers and the feed stroke commences the support bar is moved into a substantially parallel relation with the feed platform 20.

The lead fingers pick up the charge of hay moved along the feed platform by the pivotally mounted feed fingers 48 and 50. The hay delivered in front of this charge by the pickup unit will also be swept into the bale chamber. In this feed stroke to the bale chamber, the lead feed fingers 46 travel in a path parallel to the platform 20. This parallel path continues into the bale chamber. The sprocket 60 is positioned over the right side and center of the bale chamber so that, from the center portion of the bale chamber, the support bar 44 starts to move upwardly. The cam track end of the support bar is in the straight portion of the cam track. As the pivotal connection 52 moves upwardly along sprocket 60 the feed fingers 46 are swept up in an arc towards the upper outer corner 120 of the bale chamber. The curved configuration of the lead feed fingers carries the crop material up past the plunger rails 122 into the corner 120.

On the feed stroke, the hay or crop material is pushed along in front of the feed fingers and drapes around the feed fingers to drag the crop material along to the rear. Thus, the feed finger carries a folded charge of crop material into the bale chamber to fill the bale chamber at the opening 22. In the formation of the bale, many of these charges are fed to the bale chamber and compressed. On compression, these charges become slices of the bale. For a properly shaped bale these slices must be uniform in density across the bale chamber. The mass of hay fills the bale chamber at the opening 22. The plunger is commencing its compression stroke to start compressing and holding the hay before the feed fingers 46 are removed from the bale chamber. The pivotal connection 52 is moving in a substantially vertical arc around the sprocket 60 to withdraw the feed fingers substantially vertically from the bale chamber. The crop guard rod 91 holds any crop material in the bale case that the feed fingers may tend to pull out. Thus the crop material is held in the corner 120 as the plunger is starting to compress the charge into a slice. The plunger moves past the opening 22 and cuts the charge of hay in the bale chamber from the hay in the feed chamber to form a square slice uniform in density.

While the lead feed fingers 46 are feeding or sweeping the charge of crop material into the bale case the pivotally mounted feed fingers 48 at the cam track end of the supporting bar have pivoted into the vertical feed position under the action of the springs 89,90 and move down in the arcs, indicated in FIG. 6, through the right side of the feed chamber to sweep the hay from the right half of the feed chamber over to the left side of the feed chamber including where the feed fingers 46 enter on the commencement of the feed stroke. Thus the hay is progressively moved across the feed chamber.

When the lead feed fingers are in their innermost position on the support bar 44, as shown in FIGS. 1 and 6, the conical tips follow the dash line closest sidewall 34 of the bale case. In positions $a$ and $b$, the feed fingers are moving upwardly and towards the wall 34 of the bale case and towards the upper outer corner 120. In position $c$, the feed finger is moving vertically and, in position $d$, the feed finger is being retracted through the slot 38 in the bale case and opening 121 in the left end wall of the drive housing. The curved portions of the feed fingers carry the hay upwardly past the plunger guide rails 122. These rails have a stripping action that the curved portions of the feed fingers counter. The feed fingers carry the hay into the upper corner before the fingers have any substantial movement away from the wall 34. As indicated in FIG. 1, bracket 94 may be adjustably mounted over a range of positions from I to II. In these positions the feed fingers will follow similar paths $x$, $y$, further spaced from the wall 34 and the upper outer corner 120. The arc of the tips of the feed fingers in two of these positions are indicated by the dash lines in FIG. 1. The bracket may be set at one of these other positions when it is either necessary or desirable, due to the crop and crop conditions, for the feed finger to penetrate and sweep so close to the upper outer corner.

As illustrated in FIG. 1, the support bar has a single pair of feed fingers. This has been found to be sufficient in cooperation with the rear feed fingers 48 and 50 to sweep the incoming hay from the feed chamber into the bale chamber. Thus the described combination reduces the number of feed fingers needed. The curved and angled feed fingers provides for the proper baling of very difficult grasses to render the baler more versatile in the crops which it may bale in the desired square shape.

Summary of Features and Advantages of the Invention

It is thus seen from the foregoing description that the feed mechanism described in the U.S. Pat. No. 2,950,670 has been modified in accordance with this invention to be more adaptable to crops and crop conditions so that the baler is even more versatile. The curved configuration of the lead feed fingers provide for an aggressive lifting of the crop up to the upper outer corner. A further feature of this invention is that the lead feed fingers may be positioned over a range of settings from the pivotal connection so that the feed fingers can have one of the number of different arcs of travel up through the bale chamber depending upon the crop and crop condition. This adjustment may be readily made in the field by the operator to attain the desired squareness of shape of the bale. This provides still more versatility to the baler.

These changes in the baler, described in the aforementioned patent, are made without materially altering the baler. Thus the baler may be inexpensively modified in accordance with this invention. The opening in the top wall is extended and the bracket supporting the end of the crop guard is slightly modified. And of course the addition of a bracket in place of the feed finger mounting involves only the making of another part.

While this invention has been described in connection with a particular embodiment thereof, it will be understood that it is capable of further modification and this application is intended to cover any variations, uses or adaptations of the invention, following; in general, the principles of the invention and including such departures from the present disclosure as come within known or customary practice in the art to which the invention pertains, and as fall within the scope of the invention as the limits of the appended claims.

Having thus described our invention, what we claim is:

1. In a hay baler, the combination comprising:
    a fore-and-aft horizontally extending bale chamber having a feed opening in a vertical sidewall thereof and a slot in a top wall thereof, said slot communicating with said opening,
    a plunger reciprocal in said chamber and past said opening and slot,
    a hay receiving platform extending laterally from said opening,
    a support bar above said chamber and platform and axially extending in the direction of extent of the platform, said support bar having an inner end proximate to said chamber and an outer end remote therefrom,
    a pair of laterally spaced sprockets rotatable in a vertical plane perpendicularly to the fore-and-aft extension of said bale chamber,
    means supporting one of said sprockets over said bale chamber and the other of said sprockets over said platform,
    an endless chain extending around said sprockets,
    power means connected to at least one of said sprockets to drive said one sprocket and said chain,
    means connecting said inner end of said support bar to said chain,
    means supporting said outer end of said support bar,
    a set of feed fingers each having an upper straight portion and a lower end curved portion,
    means for adjustably mounting the feed fingers on the support bar with the upper straight portion of said feed fingers extending downwardly and inwardly in the direction of the bale case and the lower tips of said end curved portions extending towards said bale case,
    said adjustable mounting means including a bracket movable axially along said support bar for setting said feed fingers over a range of positions, said adjustable mounting means further including clamping means on opposite sides of said bracket and pivotally movable with respect to said bracket for clamping said feed fingers on said bracket over a range of angular positions with respect to the axial extent of said support bar,
    whereby when the support bar is moved by said chain, the feed fingers will initially move parallel to said platforms and into the bale chamber through said opening and slot as the portion of said chain connected with said bar moves between said sprockets and the feed fingers will then move upwardly along any one of a number of arcuate paths depending upon the setting of said adjustable mounting means with said curved end portions of said fingers carrying hay into the upper corner of the bale chamber opposite the opening and generally vertically out of said bale chamber through said slot as said chain portion moves about said one sprocket supported over said bale chamber.

2. In a hay baler,
    a fore-and-aft horizontally extending bale chamber having a feed opening in a vertical sidewall thereof and a slot in a top wall thereof, said slot communicating with said opening, a plunger reciprocal in said chamber and past said opening and slot, a hay receiving platform extending laterally from said opening, a support bar above said chamber and platform and extending in the direction of extent of the platform, said support bar being rectangular in shape and having an inner end proximate to said chamber and an outer end remote therefrom, a pair of laterally spaced sprockets rotatable in a vertical plane perpendicularly to the fore-and-aft extension of said bale chamber, means supporting one of said sprockets over said bale chamber and the other of said sprockets over said platform, an endless chain extending around said sprockets, power means connected to at least one of said sprockets to drive said one sprocket and said chain, means connecting said inner end of said support bar to said chain, means supporting said outer end of said support bar, a set of feed fingers each having an upper straight portion and a lower end curved portion, means for adjustably mounting the feed fingers on the support bar with the upper straight portion of said feed fingers extending downwardly and inwardly in the direction of the bale case and the lower tips of said end curved portions extending towards said bale case, said adjustable mounting means including a bracket movable on said support bar for setting said feed fingers over a range of positions, said bracket being U-shaped with a base and spaced legs, said base being along the bottom and said legs on opposite sides of said support bar, said adjustable mounting means further including clamping means mounted on said respective legs of said bracket for clamping said feed fingers on said bracket, the parts being so arranged and constructed that when the support bar and the feed fingers thereon are moved by said chain, the feed fingers will initially move parallel to said platform and into the bale chamber through said opening and slot and then upwardly with said lower end curved portions of said fingers carrying hay into the upper corner of the bale chamber opposite the opening and the feed fingers moving generally vertically out of said bale chamber through said slot.

3. In a hay baler as set forth in claim 2 wherein said clamping means each have U-shapes each attached along one side to said respective legs.

4. In a hay baler as set forth in claim 3 wherein the lower ends of said respective clamping means are tilted approximately 15° away from the vertical in the direction of the bale case.

* * * * *